(12) United States Patent
Chapuis

(10) Patent No.: US 7,583,487 B2
(45) Date of Patent: *Sep. 1, 2009

(54) SYSTEM AND METHOD FOR MANAGING FAULT IN A POWER SYSTEM

(75) Inventor: Alain Chapuis, Morgan Hill, CA (US)

(73) Assignee: Power-One, Inc., Camarillo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/930,107

(22) Filed: Oct. 31, 2007

(65) Prior Publication Data

US 2008/0052016 A1 Feb. 28, 2008

Related U.S. Application Data

(62) Division of application No. 10/890,573, filed on Jul. 13, 2004, now Pat. No. 7,372,682.

(51) Int. Cl.
H02H 7/00 (2006.01)
(52) U.S. Cl. ......................................... 361/62
(58) Field of Classification Search ..................... 361/62
See application file for complete search history.

(56) References Cited

U.S. PATENT DOCUMENTS

| 3,660,672 A | 5/1972 | Berger et al. |
| 4,194,147 A | 3/1980 | Payne et al. |
| 4,204,249 A | 5/1980 | Dye et al. |

(Continued)

FOREIGN PATENT DOCUMENTS

CN 2521825 11/2002

(Continued)

OTHER PUBLICATIONS

The I2C-Bus Specification, Version 2.1, Jan. 1, 2000; Document Order No. 9398 393 40011, pp. 1-46.

(Continued)

Primary Examiner—Stephen W Jackson
(74) Attorney, Agent, or Firm—O'Melveny & Myers LLP

(57) ABSTRACT

A power control system comprises a plurality of power control groups, with each group comprising a plurality of individual point-of-load regulators each adapted to provide respective regulated voltage outputs. The point-of-load regulators may be selected for inclusion in a power control groups based on characteristics of loads supplied by the point-of-load regulators. An intermediate bus controller is coupled to each of said power control groups through a serial data bus interface common to each group and an OK status line for each respective group. A front end regulator provides an intermediate bus voltage to each of the plurality of power control groups and to the intermediate bus controller. The plurality of point-of-load regulators of each group each further comprises a respective fault manager adapted to detect fault conditions and selectively communicate notifications of the fault conditions to other ones of the plurality of point-of-load regulators of the group and to the intermediate bus controller. This way, a common response to the fault conditions is taken by the point-of-load regulators of the group and other groups. A method for managing faults in the power control system is also disclosed.

31 Claims, 8 Drawing Sheets

U.S. PATENT DOCUMENTS

| | | |
|---|---|---|
| 4,328,429 A | 5/1982 | Kublick et al. |
| 4,335,445 A | 6/1982 | Nercessian |
| 4,350,943 A | 9/1982 | Pritchard |
| 4,451,773 A | 5/1984 | Papathomas et al. |
| 4,538,073 A | 8/1985 | Freige et al. |
| 4,538,101 A | 8/1985 | Shimpo et al. |
| 4,607,330 A | 8/1986 | McMurray et al. |
| 4,616,142 A | 10/1986 | Upadhyay et al. |
| 4,622,627 A | 11/1986 | Rodriguez et al. |
| 4,630,187 A | 12/1986 | Henze |
| 4,654,769 A | 3/1987 | Middlebrook |
| 4,677,566 A | 6/1987 | Whittaker et al. |
| 4,761,725 A | 8/1988 | Henze |
| 4,940,930 A | 7/1990 | Detweiler |
| 4,988,942 A | 1/1991 | Ekstrand |
| 5,004,972 A | 4/1991 | Roth |
| 5,053,920 A | 10/1991 | Staffiere et al. |
| 5,073,848 A | 12/1991 | Steigerwald et al. |
| 5,079,498 A | 1/1992 | Cleasby et al. |
| 5,117,430 A | 5/1992 | Berglund |
| 5,168,208 A | 12/1992 | Schultz et al. |
| 5,229,699 A | 7/1993 | Chu et al. |
| 5,270,904 A | 12/1993 | Gulczynski |
| 5,272,614 A | 12/1993 | Brunk et al. |
| 5,287,055 A | 2/1994 | Cini et al. |
| 5,349,523 A | 9/1994 | Inou et al. |
| 5,377,090 A | 12/1994 | Steigerwald |
| 5,398,029 A | 3/1995 | Toyama et al. |
| 5,426,425 A | 6/1995 | Conrad et al. |
| 5,481,140 A | 1/1996 | Maruyama et al. |
| 5,489,904 A | 2/1996 | Hadidi |
| 5,508,606 A | 4/1996 | Ryczek |
| 5,532,577 A | 7/1996 | Doluca |
| 5,610,826 A | 3/1997 | Whetsel |
| 5,627,460 A | 5/1997 | Bazinet et al. |
| 5,631,550 A | 5/1997 | Castro et al. |
| 5,646,509 A | 7/1997 | Berglund et al. |
| 5,675,480 A | 10/1997 | Stanford |
| 5,684,686 A | 11/1997 | Reddy |
| 5,727,208 A | 3/1998 | Brown |
| 5,752,047 A | 5/1998 | Darty et al. |
| 5,815,018 A | 9/1998 | Soborski |
| 5,847,950 A | 12/1998 | Bhagwat |
| 5,870,296 A | 2/1999 | Schaffer |
| 5,872,984 A | 2/1999 | Berglund et al. |
| 5,874,912 A | 2/1999 | Hasegawn |
| 5,883,797 A | 3/1999 | Amaro et al. |
| 5,889,392 A | 3/1999 | Moore et al. |
| 5,892,933 A | 4/1999 | Voltz |
| 5,905,370 A | 5/1999 | Bryson |
| 5,917,719 A | 6/1999 | Hoffman et al. |
| 5,929,618 A | 7/1999 | Boylan et al. |
| 5,929,620 A | 7/1999 | Dobkin et al. |
| 5,935,252 A | 8/1999 | Berglund et al. |
| 5,943,227 A | 8/1999 | Bryson et al. |
| 5,946,495 A | 8/1999 | Scholhamer et al. |
| 5,990,669 A | 11/1999 | Brown |
| 5,994,885 A | 11/1999 | Wilcox et al. |
| 6,005,377 A | 12/1999 | Chen et al. |
| 6,021,059 A | 2/2000 | Kennedy |
| 6,055,163 A | 4/2000 | Wagner et al. |
| 6,057,607 A | 5/2000 | Rader, III et al. |
| 6,079,026 A | 6/2000 | Berglund et al. |
| 6,100,676 A | 8/2000 | Burstein et al. |
| 6,111,396 A | 8/2000 | Line et al. |
| 6,115,441 A | 9/2000 | Douglass et al. |
| 6,121,760 A | 9/2000 | Marshall et al. |
| 6,136,143 A | 10/2000 | Winter et al. |
| 6,137,280 A | 10/2000 | Ackermann |
| 6,150,803 A | 11/2000 | Varga |
| 6,157,093 A | 12/2000 | Giannopoulos et al. |
| 6,157,182 A | 12/2000 | Tanaka et al. |
| 6,160,697 A | 12/2000 | Edel |
| 6,163,143 A | 12/2000 | Shimamori |
| 6,163,178 A | 12/2000 | Stark et al. |
| 6,170,062 B1 | 1/2001 | Henrie |
| 6,177,787 B1 | 1/2001 | Hobrecht |
| 6,181,029 B1 | 1/2001 | Berglund et al. |
| 6,191,566 B1 | 2/2001 | Petricek et al. |
| 6,194,856 B1 | 2/2001 | Kobayashi et al. |
| 6,194,883 B1 | 2/2001 | Shimamori |
| 6,198,261 B1 | 3/2001 | Schultz et al. |
| 6,199,130 B1 | 3/2001 | Berglund et al. |
| 6,208,127 B1 | 3/2001 | Doluca |
| 6,211,579 B1 | 4/2001 | Blair |
| 6,246,219 B1 | 6/2001 | Lynch et al. |
| 6,249,111 B1 | 6/2001 | Nguyen |
| 6,262,900 B1 | 7/2001 | Suntio |
| 6,288,595 B1 | 9/2001 | Hirakata et al. |
| 6,291,975 B1 | 9/2001 | Snodgrass |
| 6,294,954 B1 | 9/2001 | Melanson |
| 6,304,066 B1 | 10/2001 | Wilcox et al. |
| 6,304,823 B1 | 10/2001 | Smit et al. |
| 6,320,768 B1 | 11/2001 | Pham et al. |
| 6,351,108 B1 | 2/2002 | Burstein et al. |
| 6,355,990 B1 | 3/2002 | Mitchell |
| 6,366,069 B1 | 4/2002 | Nguyen et al. |
| 6,373,334 B1 | 4/2002 | Melanson |
| 6,385,024 B1 | 5/2002 | Olson |
| 6,392,577 B1 | 5/2002 | Swanson et al. |
| 6,396,169 B1 | 5/2002 | Voegeli et al. |
| 6,396,250 B1 | 5/2002 | Bridge |
| 6,400,127 B1 | 6/2002 | Giannopoulos |
| 6,411,071 B1 | 6/2002 | Schultz |
| 6,411,072 B1 | 6/2002 | Feldman |
| 6,421,259 B1 | 7/2002 | Brooks et al. |
| 6,429,630 B2 | 8/2002 | Pohlman et al. |
| 6,448,745 B1 | 9/2002 | Killat |
| 6,448,746 B1 | 9/2002 | Carlson |
| 6,456,044 B1 | 9/2002 | Darmawaskita |
| 6,465,909 B1 | 10/2002 | Soo et al. |
| 6,465,993 B1 | 10/2002 | Clarkin et al. |
| 6,469,478 B1 | 10/2002 | Curtin |
| 6,469,484 B2 | 10/2002 | L'Hermite et al. |
| 6,476,589 B2 | 11/2002 | Umminger et al. |
| 6,556,158 B2 | 4/2003 | Steensgaard-Madsen |
| 6,563,294 B2 | 5/2003 | Duffy et al. |
| 6,583,608 B2 | 6/2003 | Zafarana et al. |
| 6,590,369 B2 | 7/2003 | Burstein et al. |
| 6,608,402 B2 | 8/2003 | Soo et al. |
| 6,614,612 B1 | 9/2003 | Menegoli et al. |
| 6,621,259 B2 | 9/2003 | Jones et al. |
| 6,665,525 B2 | 12/2003 | Dent et al. |
| 6,683,494 B2 | 1/2004 | Stanley |
| 6,686,831 B2 | 2/2004 | Cook |
| 6,693,811 B1 | 2/2004 | Bowman et al. |
| 6,717,389 B1 | 4/2004 | Johnson |
| 6,731,023 B2 | 5/2004 | Rothleitner et al. |
| 6,744,243 B2 | 6/2004 | Daniels et al. |
| 6,771,052 B2 | 8/2004 | Ostojic |
| 6,778,414 B2 * | 8/2004 | Chang et al. .................. 363/67 |
| 6,788,033 B2 | 9/2004 | Vinciarelli |
| 6,788,035 B2 | 9/2004 | Bassett et al. |
| 6,791,298 B2 | 9/2004 | Shenai et al. |
| 6,791,302 B2 | 9/2004 | Tang et al. |
| 6,791,368 B2 | 9/2004 | Tzeng et al. |
| 6,795,009 B2 | 9/2004 | Duffy et al. |
| 6,801,027 B2 | 10/2004 | Hann et al. |
| 6,807,070 B2 | 10/2004 | Ribarich |
| 6,816,758 B2 | 11/2004 | Maxwell, Jr. et al. |
| 6,819,537 B2 | 11/2004 | Pohlman et al. |
| 6,825,644 B2 | 11/2004 | Kernahan et al. |
| 6,828,765 B1 | 12/2004 | Schultz et al. |
| 6,829,547 B2 | 12/2004 | Law et al. |

| | | |
|---|---|---|
| 6,833,691 B2 | 12/2004 | Chapuis |
| 6,850,046 B2 | 2/2005 | Chapuis |
| 6,850,049 B2 | 2/2005 | Kono |
| 6,850,426 B2 | 2/2005 | Kojori et al. |
| 6,853,169 B2 | 2/2005 | Burstein et al. |
| 6,853,174 B1 | 2/2005 | Inn |
| 6,888,339 B1 | 5/2005 | Travaglini et al. |
| 6,903,949 B2 | 6/2005 | Ribarich |
| 6,911,808 B1 | 6/2005 | Shimamori |
| 6,915,440 B2 | 7/2005 | Berglund et al. |
| 6,917,186 B2 | 7/2005 | Klippel et al. |
| 6,928,560 B1 | 8/2005 | Fell, III et al. |
| 6,933,709 B2 | 8/2005 | Chapuis |
| 6,933,711 B2 | 8/2005 | Sutardja et al. |
| 6,936,999 B2 | 8/2005 | Chapuis |
| 6,947,273 B2 | 9/2005 | Bassett et al. |
| 6,949,916 B2 | 9/2005 | Chapuis |
| 6,963,190 B2 | 11/2005 | Asanuma et al. |
| 6,965,220 B2 | 11/2005 | Kernahan et al. |
| 6,965,502 B2 | 11/2005 | Duffy et al. |
| 6,975,494 B2 | 12/2005 | Tang et al. |
| 6,977,492 B2 | 12/2005 | Sutardja et al. |
| 7,000,125 B2 | 2/2006 | Chapuis et al. |
| 7,000,315 B2 | 2/2006 | Chua et al. |
| 7,007,176 B2 | 2/2006 | Goodfellow et al. |
| 7,023,192 B2 | 4/2006 | Sutardja et al. |
| 7,023,672 B2 | 4/2006 | Goodfellow et al. |
| 7,049,798 B2 | 5/2006 | Chapuis et al. |
| 7,068,021 B2 | 6/2006 | Chapuis |
| 7,080,265 B2 | 7/2006 | Thaker et al. |
| 7,141,956 B2 | 11/2006 | Chapuis |
| 7,266,709 B2 | 9/2007 | Chapuis et al. |
| 7,315,157 B2 | 1/2008 | Chapuis |
| 7,315,160 B2 | 1/2008 | Fosler |
| 7,394,445 B2 * | 7/2008 | Chapuis et al. ............... 345/89 |
| 2001/0052862 A1 | 12/2001 | Roelofs |
| 2002/0070718 A1 | 6/2002 | Rose |
| 2002/0073347 A1 | 6/2002 | Zafarana et al. |
| 2002/0075710 A1 | 6/2002 | Lin |
| 2002/0104031 A1 | 8/2002 | Tomlinson et al. |
| 2002/0105227 A1 | 8/2002 | Nerone et al. |
| 2002/0144163 A1 | 10/2002 | Goodfellow et al. |
| 2003/0006650 A1 | 1/2003 | Tang et al. |
| 2003/0067404 A1 | 4/2003 | Ruha et al. |
| 2003/0122429 A1 | 7/2003 | Zhang |
| 2003/0137912 A1 | 7/2003 | Ogura |
| 2003/0142513 A1 | 7/2003 | Vinciarelli |
| 2003/0201761 A1 | 10/2003 | Harris |
| 2004/0080044 A1 | 4/2004 | Moriyama et al. |
| 2004/0093533 A1 | 5/2004 | Chapuis et al. |
| 2004/0123164 A1 | 6/2004 | Chapuis et al. |
| 2004/0123167 A1 | 6/2004 | Chapuis |
| 2004/0174147 A1 | 9/2004 | Vinciarelli |
| 2004/0178780 A1 | 9/2004 | Chapuis |
| 2004/0189271 A1 | 9/2004 | Hanson et al. |
| 2004/0201279 A1 | 10/2004 | Templeton |
| 2004/0225811 A1 | 11/2004 | Fosler |
| 2004/0246754 A1 | 12/2004 | Chapuis |
| 2005/0093594 A1 | 5/2005 | Kim et al. |
| 2005/0117376 A1 | 6/2005 | Wilson |
| 2005/0146312 A1 | 7/2005 | Kenny et al. |
| 2005/0200344 A1 | 9/2005 | Chapuis |
| 2005/0289373 A1 | 12/2005 | Chapuis et al. |
| 2006/0022656 A1 | 2/2006 | Leung et al. |
| 2006/0149396 A1 | 7/2006 | Templeton |
| 2006/0174145 A1 | 8/2006 | Chapuis et al. |
| 2006/0244570 A1 | 11/2006 | Leung et al. |
| 2006/0250120 A1 | 11/2006 | King |
| 2007/0114985 A1 | 5/2007 | Latham et al. |

FOREIGN PATENT DOCUMENTS

| | | |
|---|---|---|
| EP | 0255258 | 2/1988 |
| EP | 0315366 | 5/1989 |
| EP | 0401562 | 12/1990 |
| EP | 0660487 | 6/1995 |
| EP | 0875994 | 11/1998 |
| EP | 0877468 | 11/1998 |
| EP | 0997825 | 5/2000 |
| GB | 2377094 | 12/2002 |
| JP | 60-244111 | 12/1985 |
| JP | 1185329 | 3/1999 |
| KR | 200284495 | 8/2002 |
| RU | 1814177 | 5/1993 |
| SU | 1359874 | 12/1985 |
| WO | WO93/19415 | 9/1993 |
| WO | WO01/22585 | 3/2001 |
| WO | WO02/31943 | 4/2002 |
| WO | WO02/31951 | 4/2002 |
| WO | WO02/50690 | 6/2002 |
| WO | WO02/063688 | 8/2002 |
| WO | WO 03/030369 | 4/2003 |

OTHER PUBLICATIONS

25 Watt DC-DC Converters, Melcher The Power Partners and Power-One Group of Companies, Industrial Environment, Apr. 4, 1999, DC-DC Converters <40 Watt, G Series, 16 Pages.

-48V Programmable Hot Swap Sequencing Power Controller, Summit Microelectronics, Inc., Oct. 30, 2002, SMH4804, 41 Pages.

33702 Microprocessor Power Supply (3.0A), Analog Products MC33702 Fact Sheet; Motorola/Digital dna/Power Management Switchings; Jan. 1, 2003, pp. 1-4.

Accelerator-Control-System Interface for Intelligent Power Supplies, S. Cohen, Los Alamos National Laboratory, Jan. 1, 1992, pp. 183-186.

Advanced Configuration and Power Interface Specification, Intel Corporation, Microsoft Corporation, Toshiba Corp, Feb. 2, 1999, Revision 1.0b, 387 Pages.

Advantages of Microcontrollers in DC-DC Converters, Galaxy Power, Jan. 1, 2003 IBM Symposium, Real Solutions for Distributed Power, 8 Pages.

Agilent E364xA Single Output DC Power Supplies, User's Guide; Agilent Technologies, Part No. E3640-90001, Jan. 1, 2000, 207 pages.

Agilent E3640A-E3649A Programmable dc Power Supplies, Data Sheet; Agilent Technologies, Jan. 1, 2000, 4 pages.

Architecture and IC implementation of a digital VRM controller, Jinwen, Xiao et al, 32nd Annual IEEE Power Electronics Specialists Conference. PESC 2001. Conference Proceedings. Vancouver, Canada, Jun. 17-21, 2001, Annual Power Electronics Specialists Conference, New York, NY : IEEE, US, vol. vol. 1 of 4. Conf. 32, Jun. 17, 2001, pp. 38-47, XP010559121 ISBN: 0-7803-7067-8, figure 7.

Automating the Design of a Generic Modular Power System for the Global Market, Pedersen, George, Briggs, Steve; Massey, Paul, Advance Power Raynham Road, Bishops Stortford, Herts.; Jan. 1, 1999, CM23 5PF UK.

Auto Sequence Programming Examples for GPIB-M, Xantrex Technology, Inc., Nov. 27, 2002, 1.0a, 4 pages.

BE510 / BE510S Modules—Bipolar DC Source from 100mV to 20V and from 100nA to 4A, Innovative Test Systems; BE510 Version II, Issue 9, Nov. 12, 2000, 3 Pages.

BE52x Modules—Multi-range bipolar DC sources from 30V to 500V, 90W, Innovative Test Systems; BE52x Version A, Issue 9, Aug. 3, 2001, 3 pages.

Characteristics of Automated Power System Monitoring & Management Platforms, Hawkins, John M.; Telepower Australia Pty Ltd, Jan. 1, 2000, telepower@telepower.com.au, IEEE, Intelec, 5 Pages.

Chemistry-Independent Battery Chargers, Maxim Integrated Products, Dec. 1, 2002, 19-1158, Rev 1, MAX1647/MAX1648, 25 Pages.

The Continuing Evolution of Intelligence for Telecommunications Power Plants, Godby, Jimmy, Apr. 1, 1996, IEEE, 0-7803-3507-4/96, pp. 70-75.

Controlling and Alarming DC Power Plants via the Internet, Cosentino, Anthony P.; Sullivan, Michael C.; Baxter, Richard V. Jr.; Loeck, JonPower Conversion Products, LLC and Pensar Corporation, Jan. 1, 1998, 6 pages.
Current-Fed Multiple-Output Power Conversion, Seamus O'Driscoll; John G. Hayes and Michael G. Egan; Artesyn Technologies; Dept. of Electrical Engineering, University College Cork, Ireland, Dec. 3, 2003, 7 pages.
DALI Manual, DALI AG, Digital Addressable Lighting Interface Activity Group, ZVEI-Division Luminaires, Jan. 1, 2001, pp. 1-62.
Defendant's Artesyn Technologies, Inc.'s Preliminary Invalidity Contentions—(*Power-One, Inc.* vs. *Artesyn Technologies, Inc. et al.*), Civil Action No. 2-05-CV-463 (LED), United States District Court for the Eastern District of Texas; Apr. 26, 2006.
DHP Series DC Power Supplies, IEEE 488.2/RS-232 Options Programming Manual; Sorensen, Division of Elgar Electronics Corporation, Document No. M550005-01 Rev B, Jul. 29, 2002, 32 pages.
The Digital Addressable Lighting Interface (DALI): An Emerging Energy-Conserving Lighting Solution, Ronat, Odile; International Rectifier, Apr. 9, 2002, TP, pp. 1-6.
Digital Multiphase Power from Primarion and Intersil Changing the Landscape of Processor Power, Primarion, Inc., White Paper, Sep. 12, 2002, 6 pages.
Digitally Controlled Power Systems: How Much Intelligence is Needed and Where it Should be, Lock, Tom; RELTEC Corporation, Jan. 1, 1998, IEEE, 4 pages.
Digitally-Controlled SMPS Extends Power System Capabilities, Vinsant, Ron; DiFiore, John; Clarke, Richard, PCIM, Jun. 1, 1994, pp. 30-37.
A Digitally Controlled Zero-Voltage-Switched Fullbridge Converter, Rinne, Karl-Heinz; Theml, Klaus; Duigan, Joseph; McCarthy, Oliver, Power Conversion, Jun. 1, 1994 Proceedings, pp. 317-324.
Distributed Intelligence and Modular Architecture for Next Generation DC Power System, Duguay, Louis; Got, Pierre, Astec Advanced Power Systems, Quebec, Canada; Jan. 1, 2000, 6 pgs.
Distributed Power Hot Swap Controller, Summit Microelectronics, Inc., Mar. 19, 2001, SMH4804; 2050 2.3, 32 pages.
Dual 550kHz Synchronous 2-Phase Switching Regulator Controller, Linear Technology, Jan. 1, 1998, LTC1702, 36 Pages.
Dual Smart Card Interface TDA8020HL, Philips Semiconductors, Integrated Circuits, Data Sheet, Feb. 24, 2001, I2C Bus, TDA8020HL, Objective Specification v4.2 Supersedes data of Jan. 2001 File under Integrated Circuits, ICXX, 22 Pages.
Dual Smart Card Interface TDA8020HL/C2, Christophe Chausset, Philips Semiconductor, May 20, 2003, Application Note, TDA8020HL/C2, AN10232, 28 Pages.
Electronic Products Power Supply Special: Programmable Supplies Use Switch-Mode Topologies, Birman, Paul; Nercessian, Sarkis; Kepco, Inc. Flushing NY; vol. 37, No. 10, Electronic Products, Mar. 1, 1995; The Engineer's Magazine of Product Technology; Power Supply Special; DSO Samples Single Shots at 10 Gsamples/s Speech Recognition On A Single Chip LCD Has Flat-Panel Benefits At CRT Cost Product Update: High-Performance OP AMPS; A Hearst Business Publication; pp. 1, 5, 33-34.
Fieldbus System Engineering Guidlines, Fieldbus Foundation, 2003-2004, pp. 1-94.
High Efficiency, 2-Phase Synchronous Step-Down Switching Regulators, Linear Technology, Jan. 1, 1998, LTC1628/LTC1628-PG, 32 Pages.
High Efficiency Synchronous Step-Down Switching Regulator, Linear Technology, Jan. 1, 1998, LTC1735, 33 Pages.
High-frequency digital controller IC for DC/DC converters, Patella B J et al; APEC 2002. 17th. Annual IEEE Applied Power Electronics Conference and Exposition. Dallas, TX, Mar. 10-14, 2002, Annual Applied Power Electronics Conference, New York, NY : IEEE, US, vo1, vol. 2 of 2. Conf. 17, Mar. 10, 2002, pp. 374-380, XP010582947, ISBN: 0-7803-7404-5, p. 375, right-hand col.; figure 3.
Highly Programmable Voltage Supply Controller and Supervisory Circuit, Summit Microelectronics, Inc., Jun. 7, 2001, SMS44, Preliminary, 19 Pages.
IEEE Standard Codes, Formats, Protocols, and Common Commands for User with IEEE Std 488.1-1987, IEEE Standard Digital Interface for Programmable Instrumentation, IEEE Std 488.2-1992; IEEE, Jun. 18, 1992, ISBN 1-55937-238-9, 254 pages.
IMPI Intelligent Platform Management Bus Communications Protocol Specification v1.0, Intel, Hewlett-Packard, NEC, Dell, Document Revision 1.0, Nov. 15, 1999, 39 pages.
Implementing a Nationwide Energy Management System, Sjöberg, Stig; Hedberg, Tommy; Selberg, Lars; Wikström, Rober, Jan. 1, 2000.
Infinite Impulse Response, Wikipedia, http://en.wikipedia.org/wiki/IIR, May 2, 2006, pp. 1-4.
In-Situ Transfer Function Analysis, 2006 Digital Power Forum Presentaiton; Mark Hagen, Texas Instruments Digital Power Group, Jul. 1, 2006.
Installation Guide MPS Mainframe Model 66000A, Agilent Technologies, Agilent Part No. 66000-90001, 1991-Apr. 2000, 26 pages.
In-System Network Analyzer, 2006 Digital Power Forum Presentaiton, Silicon Laboratories, Jul. 7, 2006.
Integrate Internet Solutions Into Your Energy Management Network, Sarkinen, Johan; Lundin, Ola; Jun. 1, 1998, 7 pages.
Integrity-One: Installation, Operation and Maintenance Manual, Power-One, Inc., 1999-2003 Version 1.2 (P025374-P025559).
Integrity-One Power System—Rack System, Data Sheet, Power-One, Inc., Nov. 1, 2002, (P025580-P025583).
An Intelligent, Fault Tolerant, High Power, Distributed Power System for Massively Parallel Processing Computers, Burns, J.; Riel, J.; DiBene, T., IEEE, May 1, 1994, 0-7803-1456-5/94, pp. 795-798.
Intelligent Platform Management Interface Specification v1.5, Intel, Hewlett-Packard, NEC, Dell, Document Revision 1.1, Feb. 20, 2002, 459 pages.
Intelligent Power Supply Controller, Rumrill, R.S.; Reinagel, D.J.; IEEE, Aug. 1, 1991, 0-7803-0135-8/91, PAC 1991, pp. 1537-1539.
KEKB Power Supply Interface Controller Module, Akiyama, Nakamura, Yoshida, Kubo, Yamamoto, Katoh; High Energy Accelerator Research Organization, 1-1 Ohio, Tsukuba 305, Japan; International Conference on Accelerator and Large Experimental Physics and Control Systems, Jan. 1, 1997, Beijing, China 4 pgs.
Low Voltage Study Workshop Report, Charles E. Mullett; Lou Pechi; PSMA, Power Sources Manufacturers Association, The Multinational Power Electronics Association, Jan. 1, 2001, 150 Pages.
Magnet Power Supply Control System in KEKB Accelerators, Akiyama, Katoh, Kubo, Yamamoto, Yoshida; KEK, Tsukuba, Japan; International Conference on Accelerator and Large Experimental Physics and Control Systems, Jan. 1, 1999, Triest, Italy pp. 406-408.
Magnet Power Supply as a Network Object, Cohen, S.; Stuewe, R.; IEEE, Aug. 1, 1991, 0-7803-0135-8/91, PAC 1991, pp. 929-931.
Market Trends Toward Enhanced Control of Electronic Power Systems, Miles, F.M.; Danak, R.K.; Wilson, T.G.; Suranyi, G.G.; IEEE, Jan. 1, 1993, 0-7803-0982-0/93, pp. 92-98.
Memorandum Opinion and Order, *Power One* v *Artesyn Technologies, Inc.*; Civil Action 2:05cv463, Mar. 22, 2007.
Microchip AN811, The RS-232/DALI Bridge Interface, Microchip Technology Inc., Jan. 1, 2002, DS00811A, pp. 1-8.
Microchip AN809, Digitally Addressable DALI Dimming Ballast, Microchip Technology Inc., Jan. 1, 2002, DS00809B, pp. 1-18.
Microchip AN703, Using the MCP320X 12-Bit Serial A/D Converter with Microchip PICmicro® Devices, Microchip Technology Inc., Jan. 1, 2002, DS00703A, pp. 1-25.
Microchip PIC16C781/782 Data Sheet, 8-bit CMOS Microcontrollers with A/D, D/A, OPAMP, Comparators and PSMC, Microchip Technology Inc., Jan. 1, 2001, pp. 1-184.
Microprocessor Core Supply Voltage Set by 1 2 C Bus Without VID Lines—Design Note 279, Mark Gurries; Linear Technology—Design Notes, Jan. 7, 2002, 2 Pages.
Motorola Switch Mode Power Supply with Multiple Linear Regulators and High Speed CAN Tranceiver, Motorola, Inc. 2002; digital dna; Analog Marketing; Rev. 2.5, Nov. 1, 2002; 33394; Multi-Output Power Supply Semiconductor Technical Data.
NEBS Compliant Board Level Power System, Thomas J. DeLurio, Mikhail Guz and John Ng; Summit Microelectronics, Power One, Oct. 20, 2002, 7 Pages.
New Applications Demand Programmable Power Supplies/Sources, O'Shea, Paul; http://www.evaluationengineering.com/archive/articles/0997powr.htm, Nelson Publishing, Inc., Jan. 1, 1997, 8 pages.

New Digital Power Delivery Architecture, Bob Carroll, Primarion, Sep. 1, 2004, 5 Pages.
Non-Impact Printer Power and Motor Control System on a Chip, Masson, James; Barrow, Steven; IEEE; Apr. 1, 1995, IEEE Catalogue No. 95TH8025, 0-7803-2423-4/95, pp. 98-103.
Operating and Service Manual MQ Series DC Power Supplies, Magna-Power Electronics, Inc., Dec. 19, 2002, 48 pages.
Operating and Service Manual SBC488A, Magna-Power Electronics, Inc., Dec. 19, 2002, 58 pgs.
Operating and Service Manual SQ Series, DC Power Supplies, Magna-Power Electronics, Inc., Dec. 16, 2002, 48 pgs.
Operating Manual for Internal RS-232 Interface for XT 60 Watt and HPD 300 Watt Series Programmable DC Power Supplies, Xantrex Technology, Inc., Jun. 1, 2002, 59 pages.
An Operation and Maintenance Process Model for Energy Management, Lundin, Ola; Ericsson Components AB, Energy Systems Division, Jan. 1, 1999, S-164 81 KISTA—Stockholm, Sweden; 7 pages.
Optimizing Power Product Usage to Speed Design Validation Testing, Application Note 1434; Agilent Technologies, Nov. 22, 2002, 16 pages.
PCS Controller, Data Sheet, Power-One, Inc. Nov. 1, 2002 (P025584-P025585).
PCX-150A 150 Amp Pulsed Current Source Operation Manual, Version 3.0, Directed Energy, Inc., Jan. 1, 2001, Document No. 9100-0212 R4, 31 pages.
PMP 25 Rectifier Module, Data Sheet, Power-One, Inc., Undated, (P025602-P025603).
Power Distribution Systems for Future Homes, Lee, Po-Wa; Lee, Yim-Shu; Lin, Bo-Tao; IEEE, Aug. 1, 1999, 0-7803-5769-88/99, pp. 1140-1146.
A Power LAN for Telecommunication Power Supply Equipment, Vun C.H., Nicholas; C.T., Lau; B.S., Lee; IEEE TENCON '93 Beijing, Jan. 1, 1993, pp. 24-27.
Power Management Solutions for Networking Applications, Darmon, Luc; Smart Networks Developer Forum 2003, Jun. 4-6, 2003, Euro-Disney Paris, France, Motorola digital dna; pp. 1-26; www.motorola.com/sndf.
Power System Controller in an Intelligent Telecom Rectifier Plant, Roth, Ueli; IEEE, Aug. 1, 1992, 0-7803-0779-8/92, pp. 476-483.
Preliminary Information 1.5A Switch-Mode Power Supply with Linear Regulator, 33701; Power Supply Integrated Circuit; Motorola Semiconductor Technical Data; Analog Marketing MC33701/D Rev. 1.0, May 1, 2003; Motorola digial dna; pp. 1-24.
Presenting DALI, AG DALI, Jul. 1, 2003, pp. 1-17.
Programmable Four-Channel Step-Down DC/DC Converter, Texas Instruments, Oct. 1, 2001, TPS54900, 16 Pages.
Programming Guide Series 661xxA MPS Power Modules, Agilent Technologies, Agilent Part No. 5959-3362, 1991-2000, 114 pages.
Programmer Manual, PS2520G & PS2521G Programmable Power Supplies, Tektronix, 070-9197-00, Jan. 1, 1995, 70 pages.
Power Management for Communications: Product Information, Summit Microelectronics, Inc., Jan. 23, 2001, 168 Pages, http://www.summitmicro.com.
Power Management for Communications: Corporate Overview, Summit Microelectronics Inc., Oct. 1, 2002, 213 Pages.
Power Semiconductors and Power Supplies—The Building Blocks of the Digital Power Revolution, Todd Cooper and Holman Harvey; Stephens, Inc. Investment Bankers, Sep. 1, 2000, 132 Pages.
Quad Tracking Power Supply Manager, Summit Microelectronics, Inc., Mar. 4, 2002, SMT4004, 35 Pages.
Quantization Resolution and Limit Cycling in Digitally Controlled PWM Converters, Peterchev, Angel V.; Sanders, A.V.; Electrical Engineering and Computer Science; UC Berkley; Power Electronics Specialists Conference, 2001.PESC, vol. 2, Jun. 17-21, 2001; pp. 465-471; XP002274573.
R Option, S Option DC Power Supplies, IEEE 488.2/RS-232 Programming Manual; Power Ten, Document No. M550013-01 Rev C, Jun. 25, 2002, 56 pages.
SCPI Programming Examples for GPIB-M, Xantrex Technology, Inc., Nov. 26, 2002, 1.0, 3 pages.
Service Guide for Agilent 6610xA Power Modules, Agilent Technologies, Agilent Part No. 5959-3364, Dec. 1, 2002, 101 pages.

Silicon Labs Preliminary Invalidity Contentions, Civil Action No. 2-05-CV-463 (LED)—May 26, 2006 (U.S. District Court Eastern District of Texas).
A Simple digital hardware to control a PFC converter, Zumel P et al; IECON'01. Proceedings of the 27th. Annual Conference of the IEEE Industrial Electronics Society. Denver, CO, Nov. 29-Dec. 2, 2001, Annual Conference of the IEEE Industrial Electronics Society, New York, NY : IEEE, US, v01. vol. 1 of 3. Conf. 27, Nov. 29, 2001, pp. 943-948, XP010572905 ISBN: 0-7803-7108-9, paragraph [IIIC].
Single-Inductor Multiple-Output Switching Converters, Wing-Hung Ki and Dongsheng Ma; Integrated Power Electronics Laboratory, Department of Electrical and Electronic Engineering, The Hong Kong University of Science and Technology, Clear Water Bay, Hong Kong SAR, China, Jan. 1, 2001, 6 Pages.
Six-Channel Power Supply Supervisor and Cacsade Sequence Controller, Summit Microelectronics, Inc., Jul. 16, 2003, SMS66, Preliminary Information, 26 Pages.
SMBus Controls CPU Voltage Regulators without VID Pins, Mark Gurries, Design Ideas, Linear Technology Magazine, Sep. 1, 2001, 2 Pages.
SMBus VID Voltage Programmers, Linear Technology, Jan. 1, 2001, LTC1699 Series, 20 Pages.
SMH4804, SMP9210 and SMT4004 Telecom Reference Design, Summit Microelectronics, Inc., Sep. 5, 2002, Application Note 25, 17 Pages.
Synchronization of Multiple Voltage Regulator Outputs, Mueller, M.W.; et al., IBM Technical Disclosure Bulletin, Jun. 1, 1999; 2 pages.
System Management Bus (SMBus) Specification Version 2., Duracell, Inc., Energizer Power Systems, Inc., Fujitsu, Ltd., Intel Corporation, Linear Technology, Inc., Maxim Integrated Products, Mitsubishi Electric Semiconductor Company, PowerSmart, Inc., Toshiba Battery Co. Ltd., Unitrode Corporation, USAR Systems, Inc., Aug. 3, 2000, pp. 1-59.
System Management Bus Specification, Revision 1.1, Smart Battery System Specifications, Revision 1.1, Dec. 11, 1998; Copyright 1996, 1997, 1998, Benchmarq Microelectronics Inc., Duracell Inc., Energizer Power Systems, Intel Corporation, Linear Technology Corporation, Maxim Integrated Products, Mitsubishi Electric Corporation, National Semiconductor Corporation, Toshiba Battery Co., Varta Batterie AG. 39 pgs.
Technical Overview, FOUNDATION™ fieldbus, Freedom to Choose. Power to Integrate, Fieldbus Foundation, Jan. 1, 2003, FD-043 Rev 3.0, pp. 1-37.
Testing Intelligent Power Supplies for the Los Alamos National Laboratory Accelerator Complex, Sturrock, J.C. ; Cohen, S.; Weintraub, B.L.; Hayden, D.J.; Archuleta, S.F. ; Los Alamos National Laboratory, Jan. 1, 1992, pp. 217-219.
Uniform Language for Accessing Power Plants—Human-Machine Language, ANSI T1.317-1993; American National Standards Institute, Dec. 14, 1993, 55 pages.
User's Guide Series 661xxA MPS Power Modules & Model 66001A MPS Keyboard, Agilent Technologies, Agilent Part No. 5959-3386, 1992-Apr. 2000, 53 pages.
User Manual, PS2520, PS2520G, PS2521 & PS2521G Programmable Power Supplies, Tektronix, 070-9196-00, Jan. 1, 1995, 56 pages.
Volume 1: Syntax and Style, SCPI Consortium, May 1, 1999, Version 1999.0, 67 pages.
Volume 1: Syntax and Style, Standard Commands for Programmable Instruments (SCPI) Consortium, May 1, 1997, Version 1997.0, 68 pages.
Volume 2: Command Reference, SCPI Consortium, May 1, 1999, Version 1999.0, 565 pages.
Volume 2: Command Reference, SCPI Consortium, May 1, 1997, Version 1997.0, 506 pages.
Volume 3: Data Interchange Format, SCPI Consortium, May 1, 1999, Version 1999.0, 72 pages.
Volume 3: Data Interchange Format, SCPI Consortium, May 1, 1997, Version 1997.0, 73 pages.
Volume 4: Instrument Classes, SCPI Consortium, May 1, 1999, Version 1999.0, 115 pages.

Volume 4: Instrument Classes, SCPI Consortium, May 1, 1997, Version 1997.0, 58 pages.

VXI Bus Programmable DC Power Supplies, Advanced Power Designs, Inc., Irvine, CA; Jan. 1, 1993, 5 pages.

Why have Monitoring?, Shawyer, P.; Hobbs. P.; McLeod, A.; Jan. 1, 2001, 8 Pages.

Wide Operating Range, No Sense Step-Down Controller, Linear Technology, Jan. 1, 2001, LTC1778/LTC1778-1, 24 Pages.

Wide Operating Range, No Sense Step-Down DC-DC Controller with SMBus Programming, Linear Technology, Jan. 1, 2001, LTC1909-8, 34 Pages.

Microturbine Power Conversion Technology Review, Staunton et al.; Oak Ridge National Laboratory Technical Report; Apr. 8, 2003; 40 pages.

Microcomputer Control of DC/DC Converters for Photovoltaic Applications, Peracaula et al.; Dept. of Electronics Engineering, Industrial Electronics Group—Technical University of Catalonia, Spain; 1991; 4 pgs.

"Automated Power Distribution System Hardware", Anderson et al.; Aug. 6, 1989; pp. 579-584.

"MicroSCADA Technology Rev. 8.4.2 Documentation CD: Application Objects, Chapter 5. Data Objects", CD-ROM; Sep. 18, 1998, ABB, XP002481365; 11 Pages.

"Modern User Interface Revolutionizes Supervisory Systems", D'Armour et al.; IEEE Computer Applications in Power; vol. 7, No. 1; Jan. 1, 1994; pp. 34-39.

"Open Architecture Distributed Processing—The Modern Design for Electric Power Network Automation", Hissey et al.; IEEE Region 9 Colloquium; Sep. 1990; pp. 150-161; XP010038436.

* cited by examiner

FIG. 9

| POL Fault Management: Address 00 | | | |
|---|---|---|---|
| | | | Apply To POL |
| | | | Apply To Group |
| | | | Apply To Board |
| | | | Next |
| | | | Back |
| | | | Cancel |

Propagate ─────────────┐
Latching ──────────────┤
Enable ────────────────┤
Report to IMC ─────────┤

| Trigger | Severity | | | | |
|---|---|---|---|---|---|
| Temperature High | Warning | ☐ | | | |
| Power Good | Warning | ☐ | | | |
| Tracking Differential | Fault | ☐ | ☐ | ☐ | ☑ |
| Over-Temperature | Fault | | ☐ | ☑ | ☑ |
| Over-Current | Fault | | ☐ | ☑ | ☑ |
| Under-Voltage | Fault | | ☐ | ☐ | ☑ |
| Over-Voltage | Error | | ☐ | ☐ | ☑ |
| Phase Error | Error | | ☑ | ☑ | ☑ |

Help

SYSTEM AND METHOD FOR MANAGING FAULT IN A POWER SYSTEM

RELATED APPLICATION

This application is a divisional of U.S. patent application Ser. No. 10/890,573, filed Jul. 13, 2004 now U.S. Pat. No. 7,372,682.

BACKGROUND OF THE INVENTION

Perhaps more than ever, high-end computing and telecommunications applications, for example, are using highly optimized integrated circuits such as microprocessors, field programmable gate arrays ("FPGAs"), application-specific integrated circuits ("ASICs"), etc., wherein the silicon processes for such circuits are selected and/or adjusted to maximize performance and reduce costs. This very often yields differing power supply requirements for each circuit, i.e., different discrete voltage and current levels. Further, many of these circuits require a relatively low voltage (e.g., 1 v or less), but with relatively high current (e.g., 100 A). It is undesirable to deliver relatively high current at low voltages over a relatively long distance through an electronic device for a number of reasons. First, the relatively long physical run of low voltage, high current lines consumes significant circuit board area and congests the routing of signal lines on the circuit board. Second, the impedance of the lines carrying the high current tends to dissipate a lot of power and complicate load regulation. Third, it is difficult to tailor the voltage/current characteristics to accommodate changes in load requirements.

Decentralized power architectures have been developed to address the power supply requirements for such systems. In one such power architecture, an intermediate bus voltage is distributed throughout the electronic system, and an individual point-of-load ("POL") regulators, i.e., DC/DC converters, are located at the point of power consumption within the electronic system. Each POL regulator would convert the intermediate bus voltage to the level required by the corresponding electronic circuit. Ideally, the POL regulator would be physically located adjacent to the corresponding electronic circuit so as to minimize the length of the low voltage, high current lines through the electronic system. The intermediate bus voltage can be delivered to the multiple POL regulators using low current lines that minimize loss.

This decentralization process can be pushed so far that almost all loads (microprocessors, FPGAs, etc.) in the application have their own power supply. In other words, while an application (as a whole) may be designed to perform a single main function, its power supply system (which provides power to the chips located therein) may be built from individual, stand alone POL regulators. A drawback of such power supply systems, however, is that they fail to reflect the inter-dependency of the loads the POL regulators are supplying. For example, if one POL regulator fails, then the circuit supplied by this converter will also fail without notifying or disabling the other chips that are dependant upon the first circuit. This can result in unpredictable malfunction of the load or further damage to the power supply system by overstressing the other chips and/or their related POL regulators. Conventional power supply systems provide only very simple fault management in the form of power-good signals, which an application can use to determine a faulty power supply condition of a particular POL regulator. This is generally insufficient to provide system-level protection for the loads in case of a fault.

Thus, it would be advantageous to have a system and method for managing faults in a distributed power system having a plurality of POL regulators.

SUMMARY OF THE INVENTION

The present invention provides a system and method for managing fault in a power supply system. Point-of-load regulators are assigned to virtual groups in accordance with the characteristics of the loads that they supply. In the event of a fault condition of one of the point-of-load regulators, corrective action to overcome the fault condition can be selectively applied to other point-of-load regulators of the same group n a like manner. If the fault is severe enough, the fault condition can be propagated to other groups for consistent corrective action.

In an embodiment of the invention, a power control system comprises a plurality of power control groups, with each group comprising a plurality of individual point-of-load regulators each adapted to provide respective regulated voltage outputs. The point-of-load regulators may be selected for inclusion in power control groups based on characteristics of loads supplied by the point-of-load regulators. An intermediate bus controller is coupled to each of the power control groups through a serial data bus interface common to each group and an OK status line for each respective group. A front end regulator provides an intermediate bus voltage to each of the plurality of power control groups and to the intermediate bus controller. The plurality of point-of-load regulators of each group each further comprises a respective fault manager adapted to detect fault conditions and selectively communicate notifications of the fault conditions to other ones of the plurality of point-of-load regulators of the group and to the intermediate bus controller. This way, a common response to the fault conditions is taken by the point-of-load regulators of the group and other groups.

More particularly, the intermediate bus controller further comprises a master fault manager in communication with each group through the OK status lines. The master fault manager receives the notifications of fault conditions and selectively communicates the notifications to the groups, which can then subsequently disable the point-of-load regulators in the respective groups. The point-of-load regulators each further comprise a status register in which is stored a data record of the detected fault conditions. The status register further comprises plural data fields corresponding to plural categories of detected fault conditions, such as reflecting differing levels of severity. Depending upon the type of fault detected, the fault manager of each of the point-of-load regulators may take any number of corrective action, including a) disabling a corresponding point-of-load regulator in response to one of the fault conditions and re-enabling the disabled point-of-load regulator after a pause period, b) disabling the point-of-load regulator and latching the disabled point-of-load regulator in that state, or c) disabling the point-of-load regulator and re-enabling the disabled point-of-load regulator after a pause, and if the fault persists, trying to re-enable the point-of-load regulator for a specific number of times, and if not successful, latching the point-of-load regulator in the disabled state.

The fault manager of each of the point-of-load regulators may also communicate notifications of the fault conditions to the intermediate bus controller via a corresponding one of the OK status lines. The fault manager of each of the point-of-load regulators of one of the groups receives the notifications of fault conditions from any one of the point-of-load regulators of the same group, and also receives notifications of fault conditions from the master fault manager in the intermediate bus controller assuring a synchronous enabling/disabling of several point-of-load regulators of one or more groups. In response to system wide faults, the intermediate bus controller may disable the front end regulator to thereby cut off the intermediate bus voltage from each of the plurality of power control groups. The power control system may further include a crowbar circuit responsive to the intermediate bus controller to drive the intermediate bus voltage to ground. The intermediate bus controller may also include a communication interface to a system controller to notify the user of any faults, their severity levels, and the corrective actions taken. The communication interface may also permit programming of the point-of-load regulators and/or the intermediate bus controller to define the manner in which fault conditions are managed and propagated to other point-of-load regulators and/or groups.

In another embodiment of the invention, a method for managing fault conditions in a power control system comprises the steps of detecting fault conditions locally within each point-of-load regulator of each group, selectively communicating notifications of fault conditions to other ones of the point-of-load regulators of the group and/or to other groups, and, taking a common corrective action in response to the notifications of the fault conditions by the plurality of point-of-load regulators of the group and/or to other groups. This may additionally include receiving notifications of the fault conditions and selectively communicating notifications to other groups. The corrective actions may include disabling a point-of-load regulator and re-enabling the point-of-load regulator after a pause period, disabling a point-of-load regulator and latching the point-of-load regulator in that state, disabling all point-of-load regulators of one of the groups, or disabling all point-of-load regulators of all of the groups. On a system wide basis, the corrective response may include cutting off an input voltage provided to each of the power control groups or driving to ground the input voltage provided to each of the power control groups.

A more complete understanding of the system and method of managing faults in a power system will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

FIG. 9 is another exemplary screen shot depicting a GUI for programming fault detection and handling for POL regulators within a POL control system.

DETAILED DESCRIPTION OF THE PREFERRED EMBODIMENT

The present invention provides a system and method for managing faults in a distributed power system having a plurality of POL regulators. In the detailed description that follows, like element numerals are used to describe like elements illustrated in one or more figures.

Figure 1:
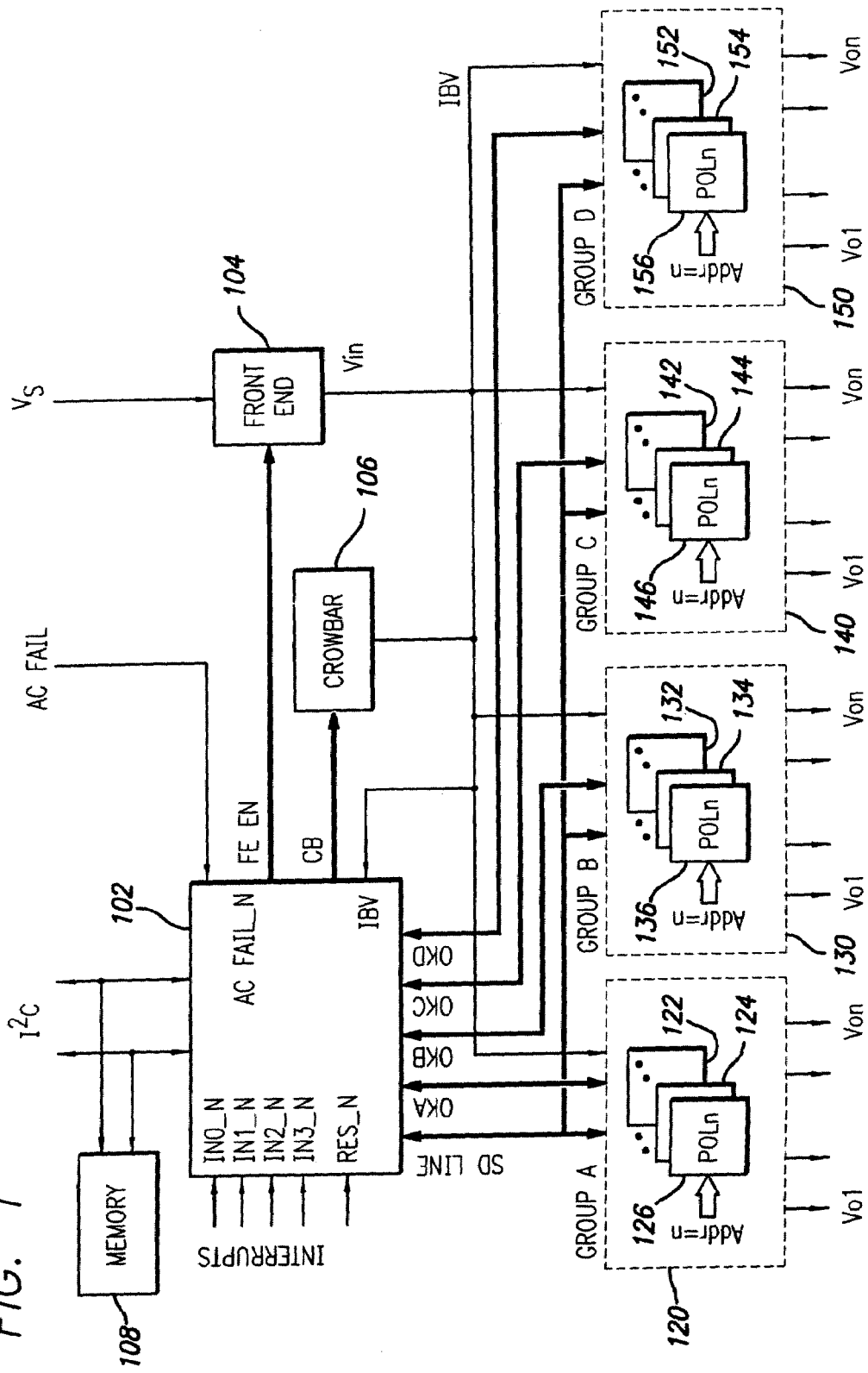
FIG. 1 is a block diagram of a point of load (POL) control system in accordance with an embodiment of the invention.

Referring first to FIG. 1, a POL control system is shown in accordance with an embodiment of the present invention. The POL control system includes an intermediate bus controller 102, a front-end regulator 104, and a plurality of groups 120, 130, 140, 150. Each of the groups includes a plurality of individual POL regulators, such that Group A 120 includes exemplary POL regulators 122, 124, 126, Group B 130 includes exemplary POL regulators 132, 134, 136, Group C 140 includes exemplary POL regulators 142, 144, 146, and Group D 150 includes exemplary POL regulators 152, 154, 156. The POL regulators depicted herein include, but are not limited to, point-of-load regulators, power-on-load regulators, DC/DC converters, voltage regulators, and all other programmable voltage or current regulating devices generally known to those skilled in the art.

Each group of POL regulators produces a plurality of output voltages that are supplied to corresponding loads. The POL regulators may be grouped depending upon the characteristics of the loads that are supplied. For example, POL regulators supplying loads with high dependencies could be placed into one group, e.g., all POL regulators supplying CPU core voltages could be placed in one group (e.g., Group A) and POL regulators supplying auxiliary circuits could be placed in another group (e.g., Group B). By grouping plural POL regulators together, the POL regulators within a group can exhibit the same responsive behavior in the case of a fault condition. Moreover, each group of POL regulators represents a virtual, and not physical, grouping of POL regulators. The POL regulators of a particular group may actually be physically separated from each other within an electrical system. It should be appreciated that the number of groups and POL regulators depicted in each group in FIG. 1 are presented solely for exemplary purposes, and that a greater or lesser number of groups and/or POL regulators within each group could be advantageously utilized.

The front-end regulator 104 provides an intermediate voltage ($V_{IN}$) to the plurality of groups over an intermediate voltage bus. The front-end regulator 14 may simply comprise another POL regulator. The intermediate bus controller 102 draws its power from the intermediate voltage bus. Although depicted as separate devices, the intermediate bus controller 102 and front-end regulator 104 may be integrated together in a single unit. Alternatively, the front-end regulator 104 may provide a plurality of intermediate voltages to the groups of POL regulators over a plurality of intermediate voltage buses.

The intermediate bus controller 102 communicates with the plurality of POL regulators by writing and/or reading digital data (either synchronously or asynchronous) via a unidirectional or bidirectional serial bus, illustrated in FIG. 1 as the synch/data (SD) line. The SD line may comprise a two-wire serial bus (e.g., I²C) that allows data to be transmitted asynchronously or a single-wire serial bus that allows data to be transmitted synchronously (i.e., synchronized to a clock signal). In order to address any specific POL regulator in any group, each POL regulator is identified with a unique address, which may be hardwired into the POL regulator or set by other methods. The intermediate bus controller 102 also communicates with each one of the plurality of groups for fault management over respective unidirectional or bidirectional serial lines, illustrated in FIG. 1 as the OKA, OKB, OKC and OKD lines (also referred to below as respective OK lines).

The intermediate bus controller 102 communicates with a user system via a serial data bus (e.g., I²C) for programming, setting, and monitoring the POL control system. A memory device 108 may optionally be coupled to the serial data bus for storing programming and initial condition data. The intermediate bus controller 102 may access this memory 108 via the serial data bus, such as to retrieve initial condition data during start-up of the POL control system. The intermediate bus controller 102 may additionally receive an input signal reflecting a failure of the AC main supply. Upon receipt of such an AC FAIL signal, the intermediate bus controller 102 may command the orderly shut down of the POL regulators.

Lastly, the intermediate bus controller 102 communicates with the front-end regulator 104 over a separate line (FE EN) to disable operation of the front-end regulator in the event of a system-wide fault. If there is a component failure in one of the POL regulators, the output of that POL regulator could experience an overvoltage condition that could damage its respective load. It is therefore very desirable to reduce as quickly as possible the intermediate bus voltage when such a fault is detected. Accordingly, the POL control system may further include an optional crowbar circuit 106 coupled to the intermediate voltage bus, which drives to ground the voltage remaining on the intermediate voltage bus and thereby cuts-off the intermediate voltage ($V_{IN}$) to the POL regulators and prevents any overvoltage conditions.

Figure 2:
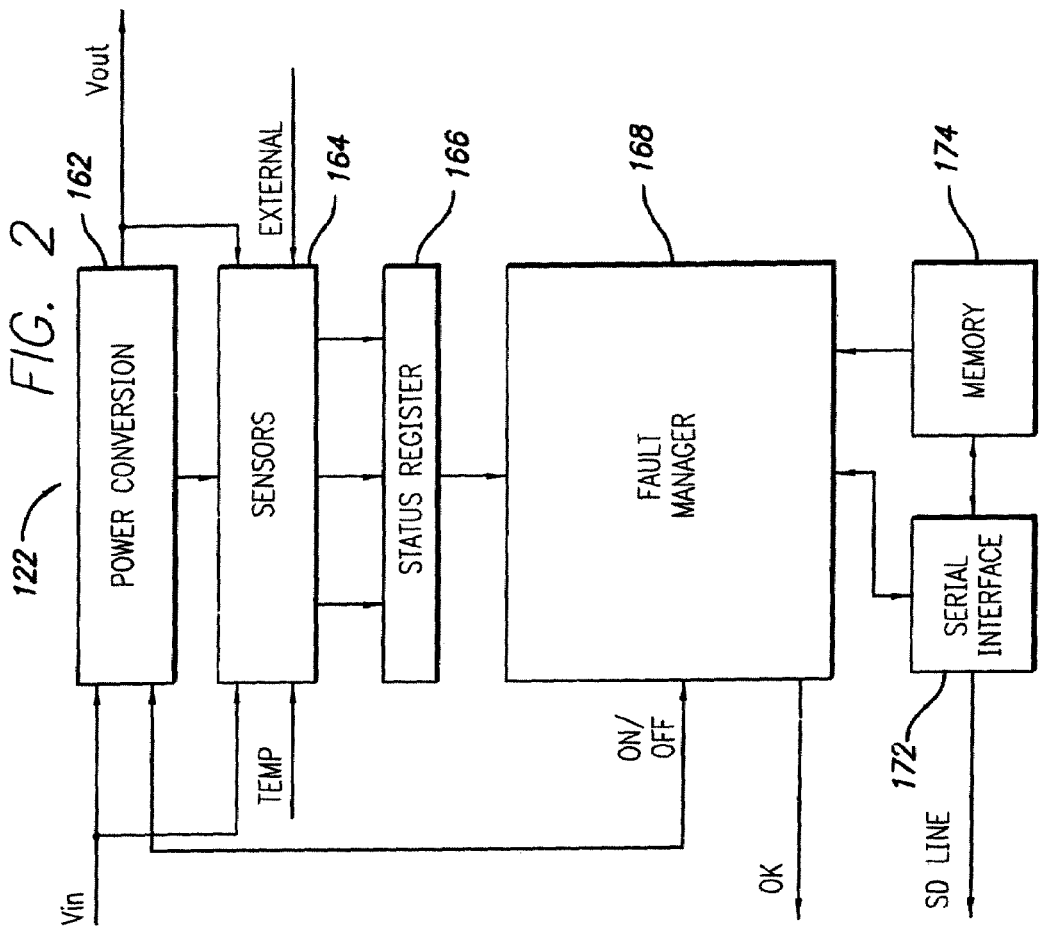
FIG. 2 is a block diagram of an exemplary POL regulator.

An exemplary POL regulator 122 of the POL control system is illustrated in greater detail in FIG. 2. The other POL regulators of FIG. 1 have substantially identical configuration. The POL regulator 122 includes a power conversion circuit 162, condition sensors 164, a status register 166, a fault manager 168, a serial interface 172, and a memory 174. The power conversion circuit 162 transforms the intermediate voltage ($V_{IN}$) to the desired output voltage ($V_{OUT}$) according to settings received through the serial interface 172 or default settings stored in the memory 174. The power conversion circuit 162 may comprise a conventional buck, boost, buck-boost, or other known DC-to-DC converter topology.

The condition sensors 164 monitor the output voltage and current, operating temperature, and other external parameters that are used for local control. The condition sensors 164 can detect fault conditions in the POL regulator. These detected fault conditions could further be classified into sub-categories depending on their severity, e.g., (i) low (i.e., warnings that parameters have exceeded certain tolerances, e.g., temperature is high, output voltage is outside of tight tolerance band, etc.), (ii) mid (i.e., fault conditions that require corrective action but are not yet urgent, e.g., temperature over limits, output voltage below limits, output current over limits, etc.), and/or (iii) high (i.e., fatal errors that require immediate corrective action to prevent harm to the POL, load or overall system, e.g., output voltage over limits, power switch of power conversion circuit in short circuit, etc.). Other classifications of detected fault conditions could also be advantageously utilized. The status register 166 is coupled to the condition sensors 164, and maintains a status record of the detected fault conditions. When a fault condition is detected by the condition sensors 164, a corresponding data record or flag is written to the status register 166.

The fault manager 168 monitors the status register 166 and determines appropriate action for the detected fault conditions. The fault manager 168 can be configured, for example, to (i) poll the status register 166 and take action to protect the individual POL regulator 122, the group to which it belongs, and/or the entire POL control system, (ii) disable the POL regulator and re-enable it after a pause period (i.e., auto recovery mode), (iii) disable the POL regulator and latch the fault, (iv) propagate the fault within the group, and/or (iv) disable the power conversion circuit 162 in case of external faults. The fault manager 168 can propagate any one of these fault conditions to other POL regulators and/or other groups by changing the status of the OK line and/or by communicating a message through the SD line. Each other POL regulator of the group would detect the fault condition by sensing the change in state of the OK line, and their respective fault managers would take corresponding action. The fault manager 168 could be programmed to latch the malfunction and prevent a restart of the POL regulator 122 when the fault trigger has disappeared, or enable the POL regulator to re-start automatically after the fault trigger has disappeared or after a predetermined period of time. It is important to note that, if the POL regulator attempts to re-start, then this can be made to occur synchronously with other POL regulators within the group that were disabled because of the fault detected by the first POL regulator.

Figure 3:
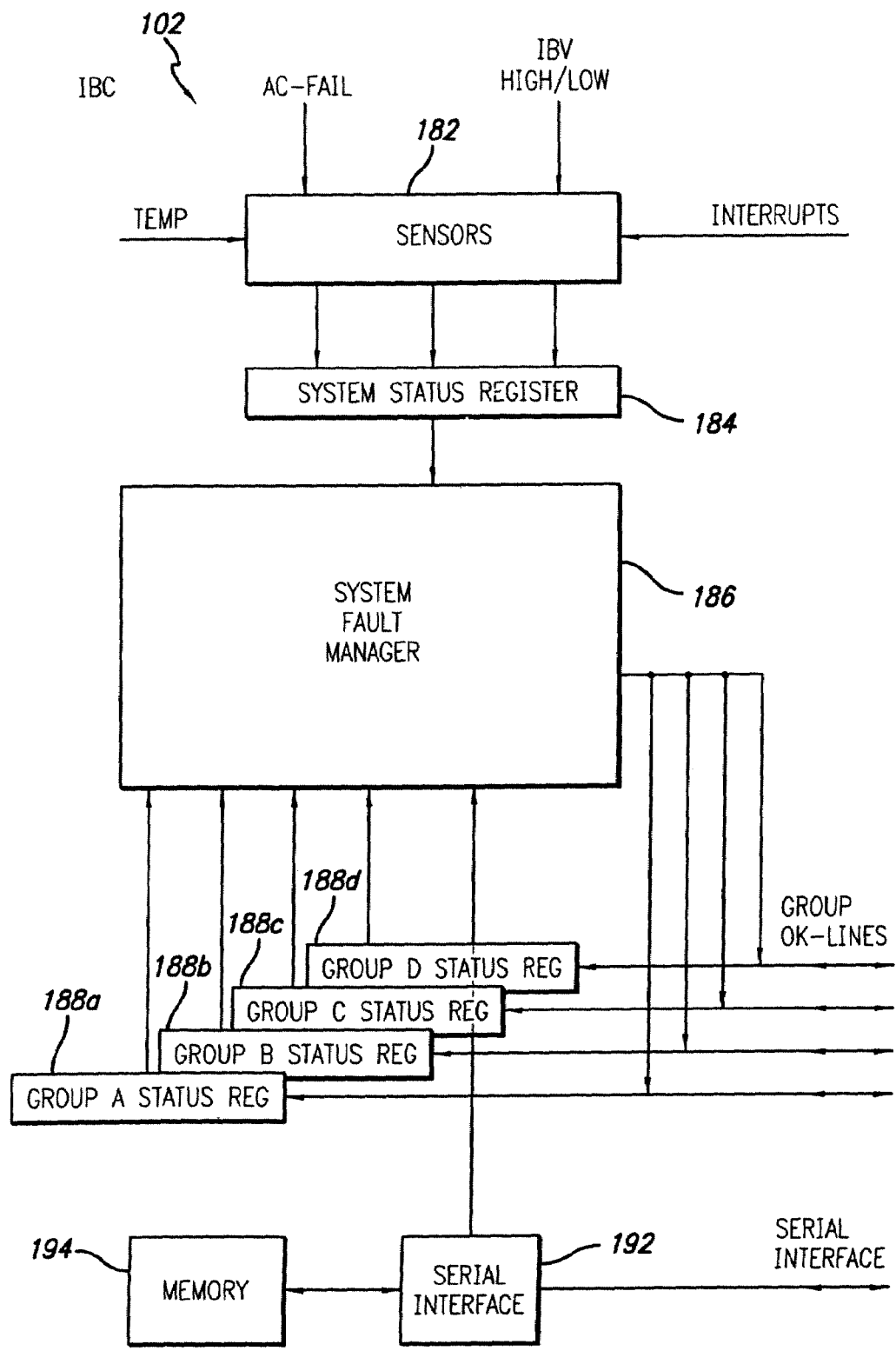
FIG. 3 is a block diagram of an exemplary intermediate bus controller.

FIG. 3 is a block diagram of an exemplary intermediate bus controller 102. The intermediate bus controller 102 includes condition sensors 182, a system status register 184, a fault manager 186, a plurality of group status registers 188*a-d*, a serial interface 192, and a memory 194. As with the condition sensors 164 of FIG. 2, the condition sensors 182 monitor the system level fault conditions, such as operating temperature, AC line failure, intermediate bus voltage level, and other external interrupts that are used to control system power. These detected fault conditions could further be classified into sub-categories depending on their severity, e.g., (i) low (e.g., temperature is high, etc.), (ii) mid (e.g., temperature over limits, AC line failure, etc.), and/or (ii) high (e.g., system level interrupts, etc.). Other classifications of detected fault conditions could also be advantageously utilized. The system status register 184 is coupled to the condition sensors 182, and maintains a status record of the detected fault conditions. When a fault condition is detected by the condition sensors 182, a corresponding data record or flag is written to the system status register 184. The group status registers 188*a-d* are each respectively coupled to a corresponding group via the respective OK line. The group status registers 188*a-d* reflect a change in status of one of the groups based on communication of information from one of the POL regulator fault managers.

The system fault manager 186 operates generally similar to the fault manager 168 of FIG. 2. The system fault manager 186 is coupled to the system status register 184 and the group status registers 188*a-d*. The system fault manager 186 can also communicate with the groups via the serial data bus by use of the serial interface 192. Depending on the severity of fault conditions reported by either the system status register 184 or one of the group status registers 188*a-d*, the system fault manager can selectively propagate the fault conditions to other groups or to the entire system. In the event of significant fault conditions, the system fault manager 186 can also trigger the crowbar circuit 106 to short the intermediate voltage bus to ground and/or disable the front-end regulator 104. The memory 194 stores the default configuration data for the intermediate bus controller 102. The default configuration is selected such that the intermediate bus controller 102 will operate in a "safe" condition in the absence of programming signals.

More particularly, the system fault manager 186 monitors the system status register 184 and group status registers 188a-c, and determines appropriate action for the detected fault conditions. If a system-wide fault is detected on the system status register 184, the fault manager 186 may take system-wide corrective action, such as shutting down each of the groups and the front end regulator 104. If a fault condition is detected that affects only one of the groups, the fault manager 186 can be configured, for example, to (i) poll the group status register 188 and take action to protect the individual group, (ii) disable each of the POL regulators of the group and re-enable them after a pause period (i.e., auto recovery mode), (iii) disable each of the POL regulators of the group and latch the disabled condition, (iv) propagate the fault condition to other groups, and/or (iv) disable the entire system by shutting off the front end regulator 104 and/or activating the crowbar circuit 106. The system fault manager 186 can propagate any one of these fault conditions by changing the status of the corresponding group OK line and/or by communicating a message through the SD line. Each group would detect the fault condition by sensing the change in state of the OK line and/or receiving a message on the SD line, and their respective fault managers would take corresponding action.

Figure 7:
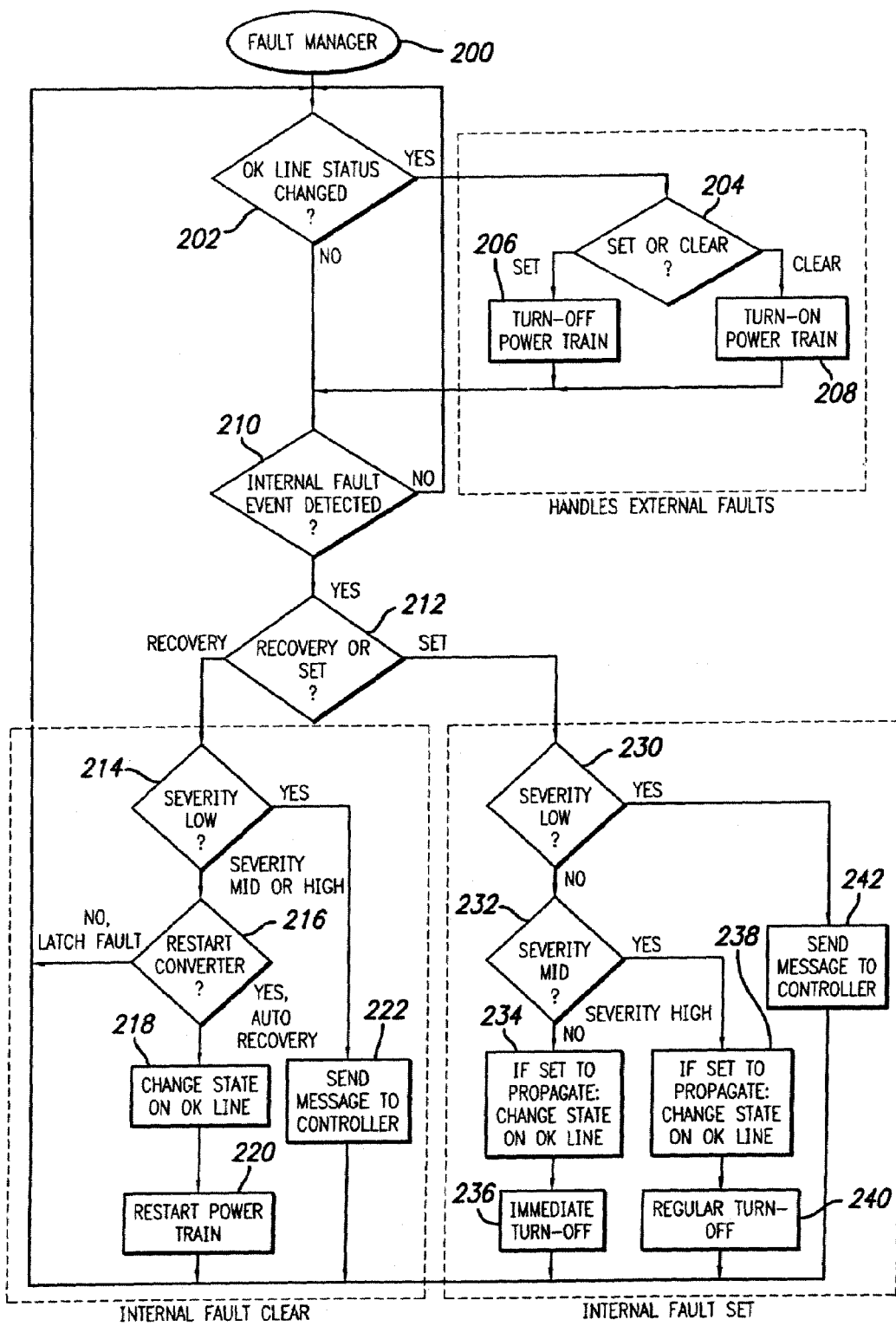
FIG. 7 is a flow diagram depicting a process for managing faults in a POL control system.

Referring to FIG. 7, a flow diagram depicts an exemplary process 200 for managing faults by a fault manager 168 of a POL regulator. Steps 202 and 210 reflect an initial loop in which the fault manager 168 checks for the presence of external and internal faults (or changes in status), respectively. In the absence of such faults (or changes in status), the fault manager 168 will continuously loop through steps 202 and 210. External faults (or changes in status) are handled by a portion of the process that includes steps 204-208. Internal faults are handled by a separate portion of the process that includes steps 212-242.

Starting at step 202, the fault manager 168 checks whether there has been a change in status of the OK line propagated by the system fault manager 186 or by the fault manager of another POL regulator of the same group. A change in status of the OK line reflects the handling of external faults by the intermediate bus controller 102 or another POL regulator, i.e., outside of this particular POL regulator, as opposed to internal faults detected by this particular POL regulator. The OK line has two possible states: (1) a clear condition (i.e., no fault condition present); and (2) a set condition (i.e., fault condition present). Thus, a change in state of the OK line from set to clear means that a previous fault condition has been resolved or cleared, and a change in state from clear to set means that a fault condition has been detected by the system fault manager 186 or by a fault manager of another POL regulator of the same group, and is being propagated to the group.

If there has been an external fault (or change in status), the fault manager 168 passes to step 204, in which the fault manager determines whether the status of the OK line has changed to set or to clear. If the status has changed to set, then the fault manager 168 shuts off the power conversion circuit 162 at step 206, thereby propagating the system fault condition locally to the POL regulator. Conversely, if the status has changed to clear, then the fault manager 168 turns on the power conversion circuit 162 at step 208, thereby propagating the clearing of the system fault condition.

Following either one of steps 206, 208, or if there has been no change in status of the OK line as detected in step 202, the fault manager passes to step 210 to determine whether an internal fault condition has been detected. If no internal fault condition has been detected, then the fault manager 168 returns to step 202 and repeats the initial check loop process. But, if an internal fault condition has been detected, the fault manager 168 decides at step 212 whether to initiate a recovery process to clear the fault condition or whether to set the fault condition.

Steps 230-242 illustrate the internal fault condition set process. The fault manager 168 selects the internal fault set process at step 212 when an internal fault event is detected for the first time. Then, at step 230, the fault manager 168 determines the severity level of the detected fault event, such as by checking the status register 166. If the severity level is low, then no corrective action is necessary other than to report the fault condition to the intermediate bus controller 102. At step 242, the fault manager 168 communicates a corresponding notification message to the intermediate bus controller 102 via the SD line. The power conversion circuit 162 of the POL regulator remains in an operational state, and the process returns to the beginning. Conversely, if the severity is not low, the fault manager 168 determines at step 232 if the severity level is mid or high. In either case, the fault manager 168 will turn off the power conversion circuit 162 of the POL regulator, albeit at a different rate depending upon the severity level. If the severity is high, the fault manager 168 immediately shuts of the power conversion circuit 162 at step 236. Alternatively, if the severity is mid, the fault manager 168 shuts of the power conversion circuit 162 at step 240 in accordance with a more orderly or gradual process (e.g., ramping down the output voltage at a predetermined rate or sequence rather than abruptly shutting it off).

At intermediate steps 234, 238, the fault manager 168 may additionally propagate the fault condition to the intermediate bus controller 102 and/or other POLs connected to the same OK line by changing the state of the OK line. The decision to propagate the fault to the intermediate bus controller 102 (i.e., steps 234, 238) may be based on initial programming of the POL regulator.

Steps 214-222 illustrate the internal fault clear (i.e., recovery) process. The fault manager 168 selects the internal fault clear process at step 212 on a subsequent pass through the process after an internal fault condition fault was previously detected. As in step 230, the fault manager 168 determines in step 214 the severity level of the detected fault event, such as by checking the status register 166. If the severity level is low, then no corrective action is necessary other than to report the fault condition to the intermediate bus controller 102. At step 222, the fault manager 168 communicates a corresponding notification message to the intermediate bus controller 102 via the SD line. The power conversion circuit 162 of the POL regulator remains in an operational state, and the process returns to the beginning. Conversely, if the severity level is not low, and the power conversion circuit 162 was turned off in a previous pass through steps 236 or 240, the fault manager 168 determines at step 216 whether to restart the power conversion circuit 162. This decision may be based on initial programming of the POL regulator. For example, the power conversion circuit 162 may be restarted if the fault condition was only a transient event lasting less than a predetermined period of time. If the decision is to not restart the power conversion circuit 122, such as if the fault condition is particularly serious or long-lasting, or if the same fault condition has recurred repeatedly after successive restarts, then the power conversion circuit 162 is latched in the off state, i.e., precluding subsequent restart of the power conversion circuit 162 without first conducting further action such as a diagnostic evaluation or maintenance service on the POL regulator.

Conversely, if the decision is to restart the power conversion circuit 162, the fault manager 168 notifies the intermediate bus controller 102 of the change in operational status by changing the state of the OK line. The fault manager 168 then restarts the power conversion circuit 162, and the process returns to the beginning.

Figure 6:
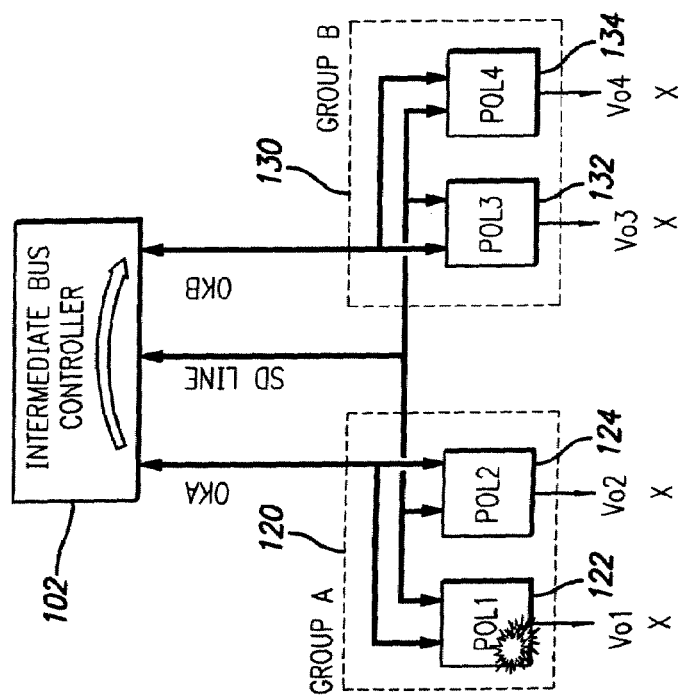
FIG. 6 is a simplified block diagram of a POL control system exhibiting a fault condition propagated to all groups within a system.
Figure 4:
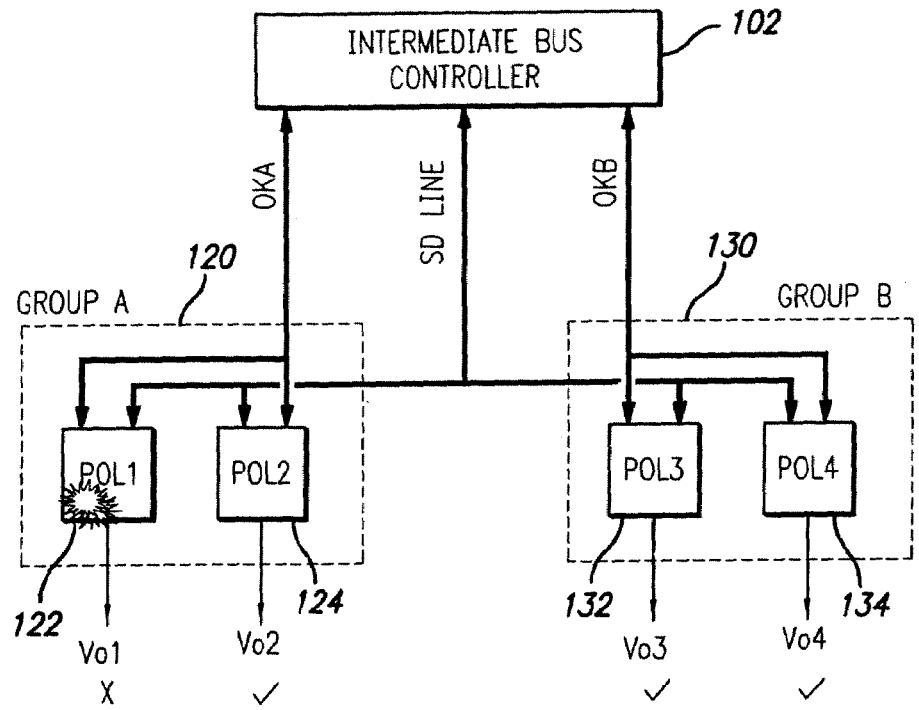
FIG. 4 is a simplified block diagram of a POL control system exhibiting a fault condition and associated response.
Figure 5:
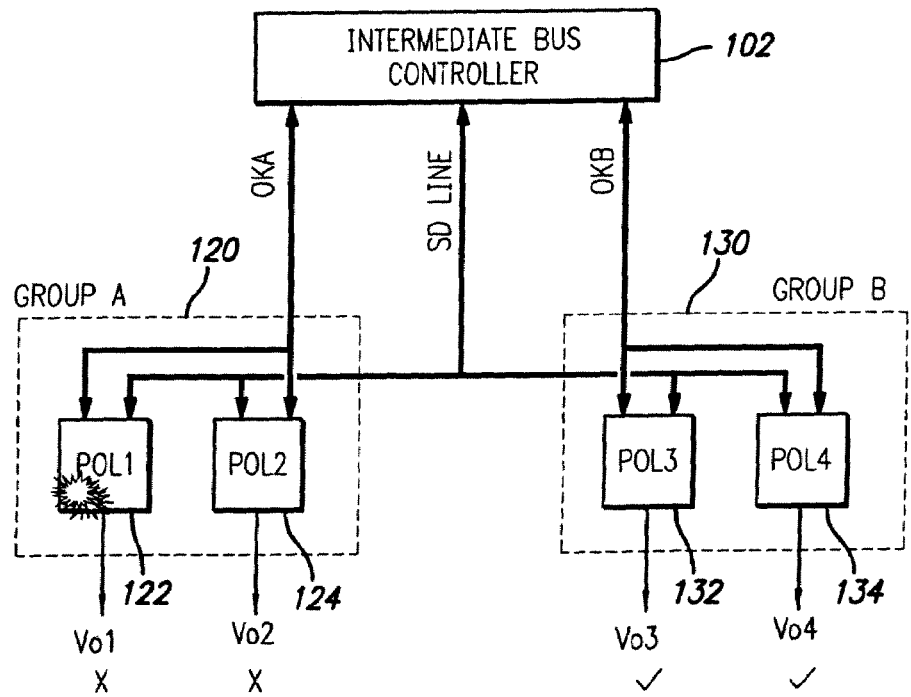
FIG. 5 is a simplified block diagram of a POL control system exhibiting a fault condition propagated to other POLs within a group.

FIGS. 4-6 illustrate the management of fault conditions within an embodiment of the present invention. These figures show an exemplary power management system with POLs organized into two groups with each group having two POLs. In FIG. 4, a fault condition is detected in POL1 of Group A. The fault manager of POL1 is programmed to shut down the power conversion circuit (as denoted by the X), either in accordance with a normal ramp down of output power or an immediate shut down, as dictated by the severity of the detected fault condition. In this embodiment, the fault manager has been programmed to not propagate the fault by changing the status of the OK line. Accordingly, POL2 of the same group remains operating normally, as are POL3 and POL4 of Group B (denoted by the check mark). The fault manager of POL1 decides whether to latch the fault or perform an auto-recovery of POL1.

In FIG. 5, a fault condition is again detected in POL1 of Group A. As in FIG. 4, the fault manager of POL1 is programmed to shut down the power conversion circuit (as denoted by the X), either in accordance with a normal ramp down of output power or an immediate shut down, as dictated by the severity of the detected fault. Unlike the previous embodiment, the fault manager has been programmed to propagate the fault within the group by changing the status of the OK line. Accordingly, POL2 of the same group has also been shut down, but POL3 and POL4 of Group B remain operational (denoted by the check mark). If the fault manager of POL1 decides to perform an auto-recovery, then both POL1 and POL2 would restart synchronously.

In FIG. 6, a fault condition is again detected in POL1 of Group A. As in FIG. 4, the fault manager of POL1 is programmed to shut down the power conversion circuit (as denoted by the X), either in accordance with a normal ramp down of output power or an immediate shut down, as dictated by the severity of the detected fault. Unlike the previous embodiments, the fault manager has been programmed to propagate the fault condition to the intermediate bus controller 102, which in turn propagates the fault to Group B. POL3 and POL4 of Group B are now shut down. If the fault manager of POL1 decides to perform an auto-recovery, then the POLs of each group would restart in an orderly manner in accordance with their programming.

As discussed above, the intermediate bus controller 102 has an interface for communicating with a user system for programming and monitoring performance of the POL control system. The user system would include a computer coupled to the interface, either directly or through a network, having suitable software adapted to communicate with the intermediate bus controller 102. As known in the art, the computer would be equipped with a graphics-based user interface (GUI) that incorporates movable windows, icons and a mouse, such as based on the Microsoft Windows™ interface. The GUI may include standard preprogrammed formats for representing text and graphics, as generally understood in the art. Information received from the intermediate bus controller 102 is displayed on the computer screen by the GUI, and the user can program and monitor the operation of the POL control system by making changes on the particular screens of the GUI.

Figure 8:
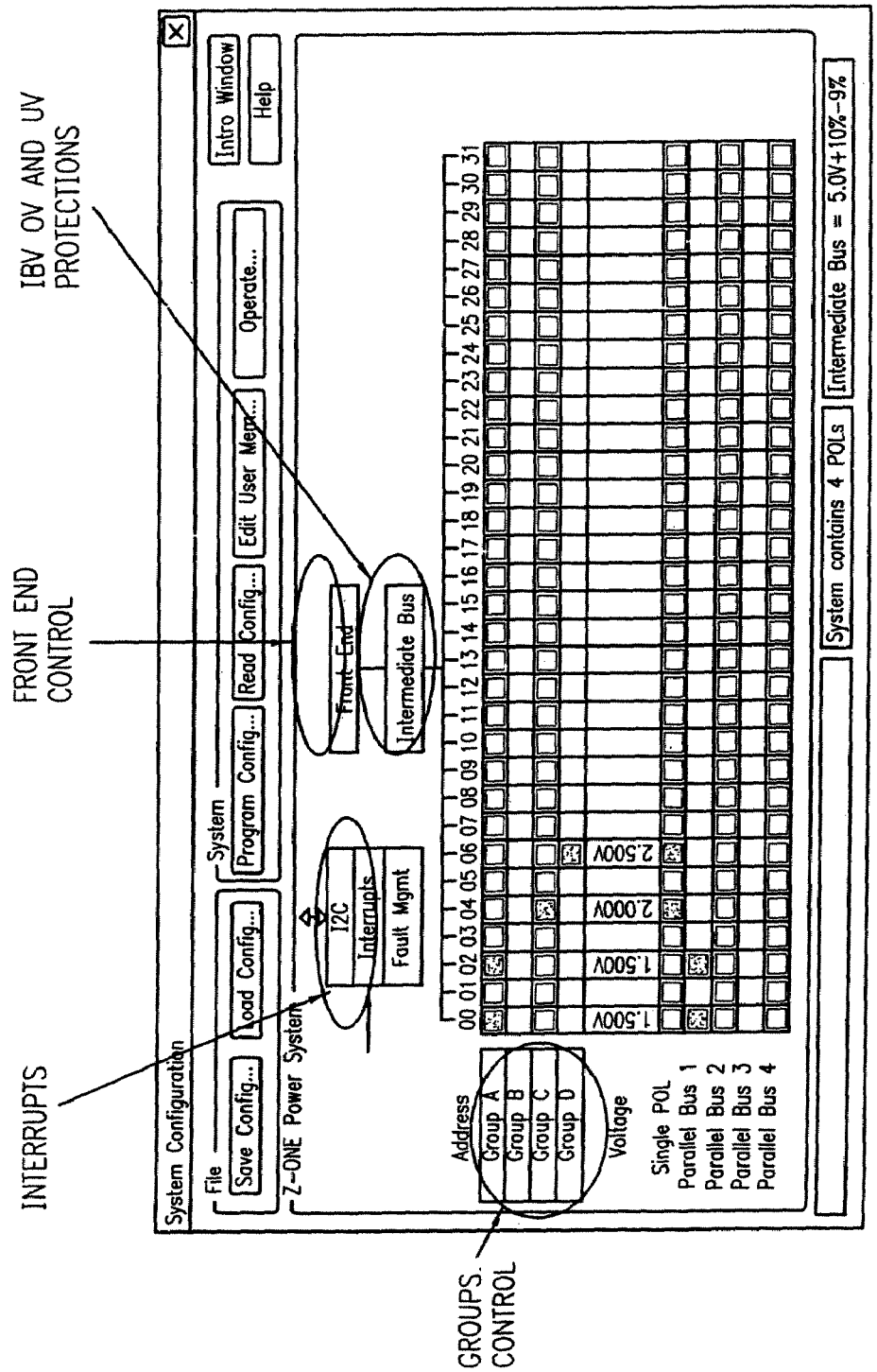
FIG. 8 is an exemplary screen shot depicting a graphical user interface (GUI) for programming the grouping of POL regulators within a POL control system.
Figure 10:
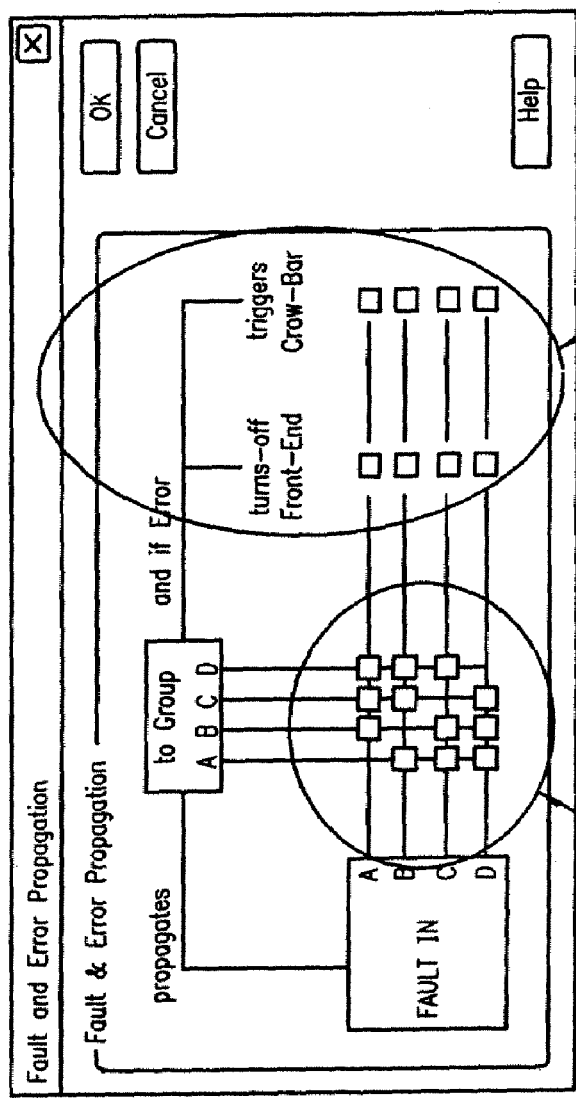
FIG. 10 is another exemplary screen shot depicting a GUI for programming of fault propagation for a POL control system.

FIGS. 8-10 illustrate exemplary screen shots of a GUI used for programming fault and error detection for a POL control system. FIG. 8 shows a screen used to define a configuration of POL regulators within a POL control system. The screen includes a matrix with the horizontal axis defining the POL number (00-31) and the vertical axis defining the group (A-D). A user can assign individual POL regulators to groups by activating (e.g., clicking on) the associated icon located at the intersection of a selected POL number and group. For example, POL numbers 00 and 02 are assigned to Group A, POL number 04 is assigned to Group C, and POL number 06 is assigned to Group D. The screen also enables the programming of interrupts, intermediate bus voltage over-voltage and under-voltage protection, and other performance characteristics. The user can create, save, and edit configuration files using the GUI screen.

FIG. 9 shows a screen used to program a configuration file for a POL regulator. The screen includes a table that identifies fault trigger type and severity. A discussed above, various fault trigger types are listed in order by severity, including temperature high and power good listed as warnings, tracking differential, over-temperature, over-current, and under-voltage listed as faults, and over-voltage and phase error listed as errors. Each fault type has corresponding user-selectable fields to designate desired handling by the fault manager, including propagate (i.e., the fault condition is propagated by changing the status of the OK line), latching (i.e., the fault condition will cause a shut-down of the power conversion circuit and latching in the shut-down state), enable (i.e., the fault condition is not reported), and report to IMC (intermediate bus controller). It should be appreciated that other fault trigger types and other choices of programmed handling can also be advantageously utilized. The user system can also determine whether the programming will be applied to one POL regulator, to all POL regulators of a group, or to all POL regulators (and groups) of the power control system.

FIG. 10 shows a screen used to program fault and error propagation for the POL control system. The screen graphically shows a first box reflecting group identity in which a fault condition originates and a second box reflecting group identity to which the fault condition is propagated. There is a series of lines connecting the two boxes, with intersections between the lines reflecting a communication from one group to another. The user can program the configuration by selectively activating icons at the intersections between the lines to define a desired propagation path. For example, the user can selectively activate icons to enable a fault condition of Group A to be propagated to Groups B and C, but not to Group D. For each group, the user can also program whether to turn off the front end 104 and activate the crowbar circuit 106 in the event of a fault condition.

Having thus described several embodiments of a system and method for managing fault in a power system, it should be apparent to those skilled in the art that certain advantages of the system have been achieved. It should also be appreciated that various modifications, adaptations, and alternative embodiments thereof may be made within the scope and spirit of the present invention. The scope of the invention is limited only by the following claims.

What is claimed is:

1. A method for managing fault conditions in a power control system comprising a plurality of power control groups, with each said group comprising a plurality of individual point-of-load regulators each adapted to provide respective regulated voltage outputs, the method comprising:

detecting fault conditions locally within each point-of-load regulator of each said group;

selectively communicating notifications of said fault conditions to other ones of said plurality of point-of-load regulators of said group and to other ones of said groups; and responding to said fault conditions in a common manner by said ones of said plurality of point-of-load regulators of said group.

2. The method of claim 1, further comprising receiving said notifications of said fault conditions and selectively communicating said notifications to other ones of said groups.

3. The method of claim 1, further comprising storing a data record of said detected fault conditions.

4. The method of claim 3, wherein said data record further comprises plural data fields corresponding to plural categories of said detected fault conditions.

5. The method of claim 1, further comprising disabling a corresponding point-of-load regulator in response to one of said fault conditions.

6. The method of claim 5, further comprising re-enabling said corresponding point-of-load regulator after a pause period.

7. The method of claim 5, further comprising latching said corresponding point-of-load regulator in the disabled state.

8. The method of claim 1, further comprising communicating said notifications of said fault conditions via a corresponding OK status line.

9. The method of claim 1, receiving said notifications of said fault conditions from any one of said plurality of point-of-load regulators of one of said groups.

10. The method of claim 1, further comprising disabling all point-of-load regulators of one of said groups in response to one of said fault conditions.

11. The method of claim 10, further comprising restarting said disabled point-of-load regulators synchronously after a predetermined time period.

12. The method of claim 10, further comprising restarting said disabled point-of-load regulators synchronously after said one of said fault conditions has cleared.

13. The method of claim 1, further comprising disabling all point-of-load regulators of all of said groups in response to one of said fault conditions.

14. The method of claim 13, further comprising restarting said disabled point-of-load regulators synchronously after a predetermined time period.

15. The method of claim 13, further comprising restarting said disabled point-of-load regulators synchronously after said one of said fault conditions has cleared.

16. The method of claim 1, further comprising cutting off an input voltage provided to each of said plurality of power control groups in response to one of said notifications of said fault conditions.

17. The method of claim 1, further comprising driving to ground an input voltage provided to each of said plurality of power control groups in response to one of said notifications of said fault conditions.

18. The method of claim 1, selecting ones of said point-of-load regulators for inclusion in at least one of said plurality of power control groups based on characteristics of loads supplied by said point-of-load regulators.

19. The method of claim 1, further comprising receiving programming instructions determining manner of performing said step of selectively communicating notifications.

20. A method for programming a power control system including a plurality of point-of-load regulators, comprising:

displaying at least one screen depicting a matrix including a first axis identifying each of said plurality of point-of-load regulators and a second axis identifying a plurality of virtual power control groups, said matrix further including a plurality of user selectable icons defining intersections between each of said plurality of point-of-load regulators and each of said plurality of power control groups;

receiving user input selecting ones of said user selectable icons; and assigning selected ones of said plurality of point-of-load regulators to ones of said plurality of power control groups in accordance with said user input;

wherein, fault conditions detected by any one of said plurality of point-of-load regulators assigned to a particular one of said plurality of power control groups are selectively propagated to other ones of said plurality of point-of-load regulators assigned to said particular one of said plurality of power control groups so that a common response to said fault conditions is taken by each one of said plurality of point-of-load regulators assigned to said particular one of said plurality of power control groups.

21. The method of claim 20, further comprising receiving user input to save a configuration file defining an assignment of said selected ones of said plurality of point-of-load regulators to said ones of said plurality of power control groups.

22. The method of claim 21, further comprising receiving user input to edit a saved configuration file defining an assignment of said selected ones of said plurality of point-of-load regulators to said ones of said plurality of power control groups.

23. A method for programming a power control system including a plurality of point-of-load regulators, comprising:

displaying at least one screen depicting a plurality of potential fault conditions and selectable types of corrective actions to be taken responsive to said potential fault conditions;

receiving user input to select ones of said selectable types of corrective actions; and programming at least one of said plurality of point-of-load regulators in accordance with said user input;

wherein, said at least one of said plurality of point-of-load regulators performs said selected types of corrective actions in response to actual fault conditions in accordance with said programming step.

24. The method of claim 23, wherein said selectable types of fault conditions include at least one of over-temperature, over-current, under-voltage, over-voltage, and phase voltage error.

25. The method of claim 23, wherein said selectable types of corrective actions include at least one of disabling a power conversion circuit of said at least one of said plurality of point-of-load regulators, restarting said power conversion circuit after a predetermined delay, latching said power conversion circuit in a disabled state, and propagating a fault condition notification to other ones of said plurality of point-of-load regulators of said power control system.

26. The method of claim 23, wherein said step of receiving user input further comprises receiving user input to determine whether said selected types of corrective action apply to a single one of said plurality of point-of-load regulators.

27. The method of claim 23, wherein said step of receiving user input further comprises receiving user input to determine whether said selected types of corrective action apply to all point-of-load regulators of a virtual group.

28. The method of claim 23, wherein said step of receiving user input further comprises receiving user input to determine whether said selected types of corrective action apply to all point-of-load regulators of said power control system.

29. A method for programming a power control system, comprising:

displaying at least one screen depicting a configuration of communication paths between a plurality of virtual power control groups, each one of said plurality of virtual power control groups having a respective plurality of point-of-load regulators assigned thereto;

receiving user input to enable selected ones of said communication paths defining propagation of fault notifications from ones of said plurality of virtual power control groups to others of said plurality of virtual power control groups; and programming said plurality of point-of-load regulators of each of said plurality of virtual power control groups in accordance with said user input;

wherein, said plurality of point-of-load regulators of each of said plurality of virtual power control groups propagate said fault notifications in accordance with said programming step.

30. The method of claim 29, wherein said step of receiving user input further comprises receiving user input to disable a front end providing input voltage to each of said plurality of virtual power control groups in addition to said propagation of fault notifications from ones of said plurality of virtual power control groups to others of said plurality of virtual power control groups.

31. The method of claim 29, wherein said step of receiving user input further comprises receiving user input to trigger a crowbar circuit to short an input voltage to each of said plurality of virtual power control groups in addition to said propagation of fault notifications from ones of said plurality of virtual power control groups to others of said plurality of virtual power control groups.

* * * * *